Patented Apr. 24, 1923.

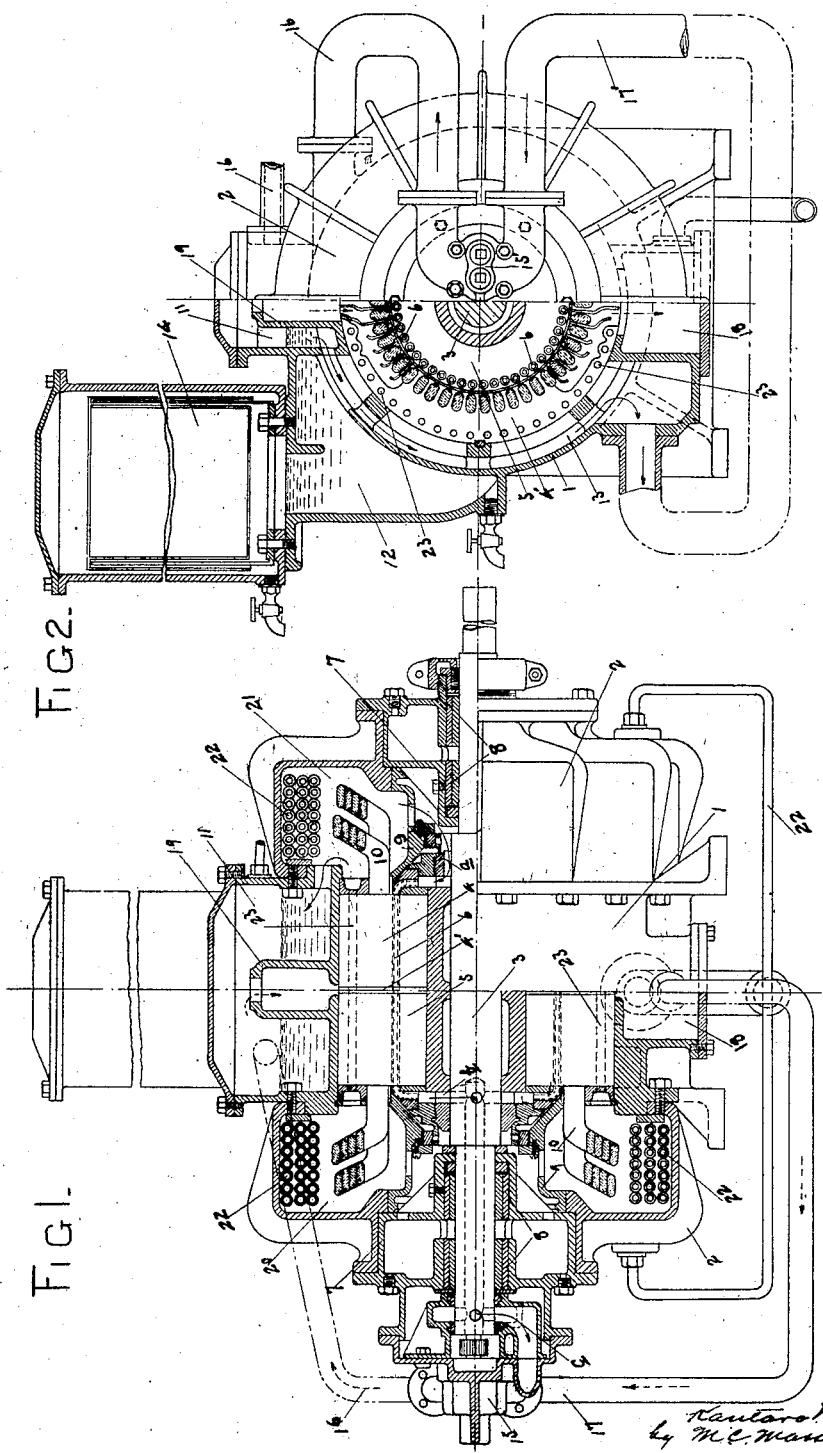

1,453,166

UNITED STATES PATENT OFFICE.

KANTARO NOBUHARA, OF MUKO-GUN, HYOGO-KEN, JAPAN.

ROTARY ELECTRIC MACHINE.

Application filed October 23, 1919. Serial No. 332,697.

To all whom it may concern:

Be it known that KANTARO NOBUHARA, citizen of Japan, residing at No. 2055 Miyanoushiro, Nishinomiya-cho, Muko-gun, Hyogoken, Japan, has invented certain new and useful Improvements in Rotary Electric Machines; and he does hereby declare the following to be a full, clear, and exact description of the invention, such as will enable others skilled in the art to which it appertains to make and use the same.

This invention relates to an improvement in the invention applied for in the United States Patent Office Serial No. 228,451. In the said invention, the main parts of a rotary electric machine are immersed in a liquid in an air tight casing, and a gas is forced into the clearance between the cores of the rotor and the stator in order to keep the liquid from touching the surface of the rotor and also to avoid frictional losses that may be incurred when the liquid touches the said surface. In this improvement instead of forcing a gas under pressure into the clearance space, the gas in the clearance space is constantly being exhausted or sucked out. This is a very useful modification of the former invention, because, by this means the machine parts may be constructed more simply.

The accompanying drawings show an induction motor according to this invention. Fig. 1 is a sectional elevation of the machine its lower half on the right hand side being left uncut. Fig. 2 is a sectional end elevation its right hand half being left uncut.

In the figures, 1 is the frame of the machine, 2 is an end cover fixed on both ends of the frame, forming an air-tight external casing of the machine in conjunction with the frame. 3 is a rotor shaft on which a rotor core, 5, with hollow conductors, 6, is fixed. The rotor shaft is made hollow at its left half; it is shown with dotted lines in Fig. 1. 4 is a stator core fixed inside of the external casing, a special duct piece or pieces, 4', as in the former invention, are inserted in the stator core.

To the end cover, 2, a bearing holder, 7, is bolted, and the rotor shaft rotates in the bearing metals, 8. 9 is a cylindrical body fixed between the stator core and the bearing holder, and the rotor core is completely enclosed by the stator core in conjunction with the said cylindrical bodies on both sides. 10 shows a stator coil or conductor.

In the topmost portion of the casing a chamber, 11, is provided, and the said chamber communicates with spaces 12 and 13 in the manner shown in Fig. 2. The space 12 has an expansible chamber or oil level controller, 14, on its top, and the space 13 is the clearance between the external casing and the stator core.

At the left end of the rotor shaft, there are two pumps, 15 and 15', directly or indirectly coupled to the shaft. The pump 15 is a gas pump and the pump 15' is an oil pump. 16 and 17 denote the delivery and the suction pipes of the former while 16' and 17' denote those of the latter respectively.

The chamber, 18, is provided at the lowest place in the casing, from which chamber the suction pipe, 17, of the gas pump starts. The said chamber also communicates with the exit or the bottom of the duct piece, 4', and the entrance or the top of the duct piece communicates with a pipe, 19, which stands in the topmost chamber 11. The delivery pipe of the gas pump opens at the upper part of the said chamber, and the delivery and the suction pipes of the oil pump open in the space 20 and the space 13 respectively. the former being the space in the end cover of the left hand side. A cooling water tube is provided in the space, 20, and a space 21, which is the space in the end cover of the right hand side. The letters 22 denote the cooling pipe in coil form, and its communicating pipe.

A liquid, preferably oil, is deposited in the casing to such a height that the topmost chamber is half filled, the working parts of the machine being immersed in the liquid. A gas, which is harmless to the said liquid is sealed in the space above the level of the liquid in the topmost chamber. Now, it can be easily understood that there are two different spaces in the machine—the dry or gas space and the wet or oil space. The lower half of the chamber 11, the spaces 12, 13, 20, 21, the pipes 16' and 17', are all wet spaces, while the higher part of the chamber 11, the pipes 16, 17, 19, the chamber 18, the duct piece or pieces 4' and the clearances over the rotor core are all dry ones.

The operation of the machine is as follows:—

Electric current is generated when the machine is in motion, and the two pumps also rotate. The oil pump sucks oil from the space 13 and delivers it to the space 20, the numerous holes, 23, in the stator core, the space 21, the chamber 11 and the space 13 in succession (a small quantity of the oil returns from the space 21 to the oil pump by a branch passage which is shown with arrows $a$, $b$, and $c$), while the gas pump sucks up the gas in the chamber 11 through the pipe 19, the entrance of the duct piece 4', the clearance over the rotor core, the exit of the same duct piece, the chamber 18 and the pipe 17 successively, and delivers it finally to the chamber 11. A small quantity of oil may leak from the wet space into the dry space, but it can be sucked out by the gas pump and is delivered to the wet space in the topmost chamber. The oil is cooled by the cooling pipe, 22, in its continuous circulation, but the gas is cooled by the oil when it comes into contact with the latter in the topmost chamber. By this means the heat generated in the cores and the conductors is consumed by the oil as well as the gas.

According to this improvement the pipe arrangement of the machine is simplified, and the float in the lowest chamber, 18, and the safety valve in the topmost chamber, may be dispensed with, although these members play important parts in the older invention.

Claims:—

1. A machine having rotary mechanism comprising a stationary part, a part movable relatively thereto and separated therefrom by a clearance space, means adapted and arranged to maintain a suitable fluid under pressure and in contact with said parts to cool the same, and means for creating a suction in said clearance space between said parts.

2. A machine having rotary mechanism comprising the combination of a stator member, a rotor member cooperating therewith and separated therefrom by a clearance space and means comprising substantially radial passages in one of said members for maintaining a partial vacuum in said clearance space.

3. A machine having rotary mechanism comprising a fluid-tight casing within which the working parts are enclosed, said working parts being separated by a clearance space, means arranged to maintain a suitable fluid at a point above the working parts, and means for creating a suction in said clearance space between said parts.

4. A machine having rotary mechanism comprising in combination, a stator and a rotor separated by a clearance, housing means therefor, a liquid pump for supplying cooling liquid to said housing to cool said stator and rotor, and a gas pump connected to said clearance and maintaining a suction therein.

5. A machine having rotary mechanism comprising housing means within which the working parts are enclosed, said working parts being separated by a clearance space, means arranged to maintain a suitable fluid at a point above the working parts, packing means resisting entry of liquid into said clearance space and means for creating a suction in said clearance space between the parts.

6. A machine having rotary mechanism comprising a fluid-tight casing within which the working parts are enclosed, said parts being separated by a clearance space, means arranged to maintain a suitable fluid at a point above the working parts, said casing being provided with an upper and a lower chamber, said upper chamber providing a liquid space and a gas space, a stand-pipe in said upper chamber opening into said gas space and connected with said lower chamber through said clearance space and fluid suction means creating a suction through said stand-pipe.

7. A machine having rotary mechanism comprising in combination a stator, and a rotor separated by a clearance, housing means therefor, means arranged to maintain a suitable fluid at a point above said stator and rotor, means for creating a suction in said clearance space and means for cooling said liquid.

8. A machine having rotary mechanism comprising a stator, a rotor separated therefrom by a clearance space, means for circulating a liquid through said stator and rotor, means for creating a suction in said clearance space and means for cooling said liquid.

In testimony whereof he hereunto affixes his signature in the presence of two witnesses.

KANTARO NOBUHARA

Witnesses:
O. EBEHARALO,
A. JACOKUFT.